(12) United States Patent
Kondo

(10) Patent No.: US 12,513,786 B2
(45) Date of Patent: Dec. 30, 2025

(54) METHODS AND SYSTEM FOR INDUCTION HEATING

(71) Applicant: Japan Tobacco Inc., Tokyo (JP)

(72) Inventor: Hideo Kondo, Oizumi-Machi (JP)

(73) Assignee: Japan Tobacco Inc., Tokyo (JP)

( * ) Notice: Subject to any disclaimer, the term of this patent is extended or adjusted under 35 U.S.C. 154(b) by 0 days.

(21) Appl. No.: 18/434,853

(22) Filed: Feb. 7, 2024

(65) Prior Publication Data

US 2024/0179807 A1    May 30, 2024

Related U.S. Application Data

(63) Continuation of application No. 16/661,050, filed on Oct. 23, 2019, now Pat. No. 11,956,878.

(60) Provisional application No. 62/877,928, filed on Jul. 24, 2019.

(51) Int. Cl.
| | |
|---|---|
| H05B 6/04 | (2006.01) |
| H05B 6/10 | (2006.01) |
| H05B 6/40 | (2006.01) |
| H05B 6/44 | (2006.01) |

(52) U.S. Cl.
CPC .............. *H05B 6/04* (2013.01); *H05B 6/101* (2013.01); *H05B 6/40* (2013.01); *H05B 6/44* (2013.01)

(58) Field of Classification Search
CPC .......... H05B 6/04; H05B 6/101; H05B 6/108; H05B 6/36; H05B 6/40; H05B 6/44
USPC ....................................................... 219/643
See application file for complete search history.

(56) References Cited

U.S. PATENT DOCUMENTS

| | | | |
|---|---|---|---|
| 2,856,498 A | 10/1958 | Jones | |
| 4,211,912 A * | 7/1980 | Kiuchi | H02M 5/27 327/461 |
| 4,761,527 A | 8/1988 | Mohr | |
| 6,121,592 A | 9/2000 | Fishman et al. | |
| 11,470,883 B2 * | 10/2022 | Kaufman | A24F 40/50 |
| 2003/0111461 A1 | 6/2003 | Morrison | |
| 2015/0027472 A1 | 1/2015 | Amir | |
| 2015/0320116 A1 | 11/2015 | Bleloch et al. | |
| 2017/0027234 A1 | 2/2017 | Farine et al. | |
| 2017/0224015 A1 | 8/2017 | Basil et al. | |

FOREIGN PATENT DOCUMENTS

| | | | | |
|---|---|---|---|---|
| CN | 1810069 B | 6/2010 | | |
| JP | 2007507074 A | 3/2007 | | |
| RU | 2734382 C1 * | 10/2020 | ............. | A24B 15/12 |
| WO | WO-2018073376 A1 * | 4/2018 | ............. | A24B 15/12 |

OTHER PUBLICATIONS

Japanese Office Action issued Aug. 15, 2025 in corresponding Japanese Patent Application No. 2024-189177, 8 pages.

\* cited by examiner

*Primary Examiner* — Steven W Crabb
*Assistant Examiner* — Ket D Dang
(74) *Attorney, Agent, or Firm* — XSENSUS LLP

(57) ABSTRACT

Various embodiments of the present technology comprise a method and system for induction heating. The system may provide a first induction coil wrapped around a metal cylinder and a second induction coil wrapped around the metal cylinder. The first induction coil may carry a current in a first direction and the second induction coil may carry a current in an opposite, second direction. The currents may be generated in an alternating sequence.

19 Claims, 6 Drawing Sheets

METHODS AND SYSTEM FOR INDUCTION HEATING

CROSS-REFERENCE TO RELATED APPLICATIONS

This application is a Continuation of application Ser. No. 16/661,050, filed on Oct. 23, 2019, which claims the benefit of U.S. Provisional Patent Application No. 62/877,928, filed on Jul. 24, 2019, the entire contents of each is incorporated herein by reference.

BACKGROUND OF THE TECHNOLOGY

Many electronic devices employ a battery, such as a lithium ion battery, to provide the primary source of power to the electronic device. In some applications, such as an electronic cigarette (also referred to as vaping devices, e-cigarettes, vape pens, nicotine vaporizers, hybrid e-cigarettes, and real tobacco e-smokes), the battery powers a heating element that is used to heat a liquid or dried tobacco to produce a vapor. Some conventional systems use a heater to indirectly heat the final target (in many cases, a metal cylinder). The indirect heating method, however, may take an undesirable amount of time to heat-up to the desired temperature and increasing the temperature at a faster rate requires an increase in power consumption. It may be desired to directly heat the final target using induction heating with minimal circuitry.

SUMMARY OF THE INVENTION

Various embodiments of the present technology provide a method and system for induction heating. The system may provide a first induction coil wrapped around a metal cylinder and a second induction coil wrapped around the metal cylinder. The first induction coil may carry a current in a first direction and the second induction coil may carry a current in an opposite, second direction. The currents may be generated in an alternating sequence.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

FIG. 1 representatively illustrates an induction heating system in accordance with an exemplary embodiment of the present technology;

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various heating elements, signal & pulse generators, voltage sensors, current sensors, coulomb counters, logic gates, memory devices, semiconductor devices, such as transistors and capacitors, and the like, which may carry out a variety of functions. In addition, the present technology may be practiced in conjunction with any number of systems, and the systems described are merely exemplary applications for the technology. Further, the present technology may employ any number of conventional techniques for measuring voltage, measuring current, computing a capacity of the battery, carrying out various mathematical computations, storing data, and the like.

Figure 1:
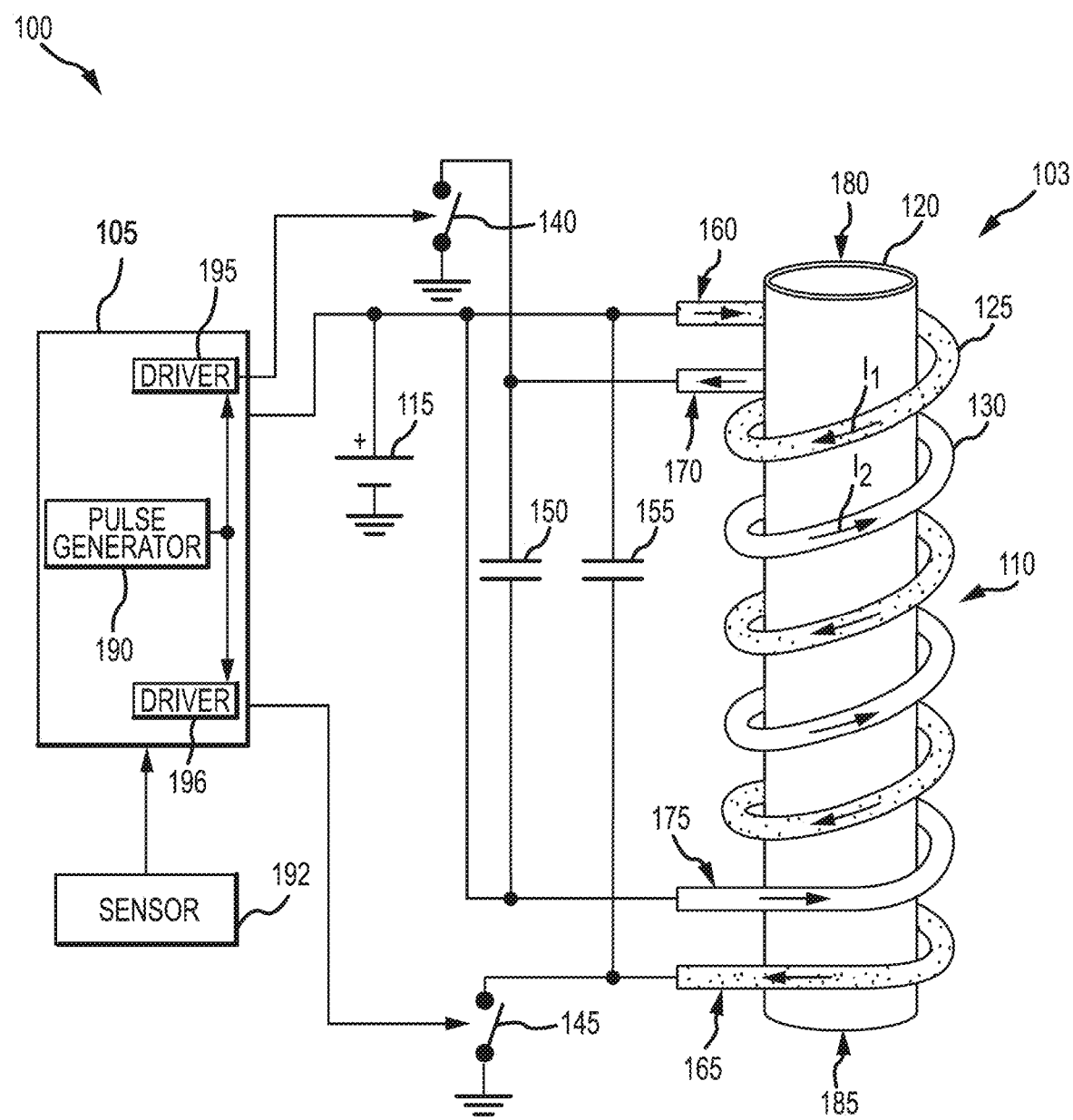
Figure 2:
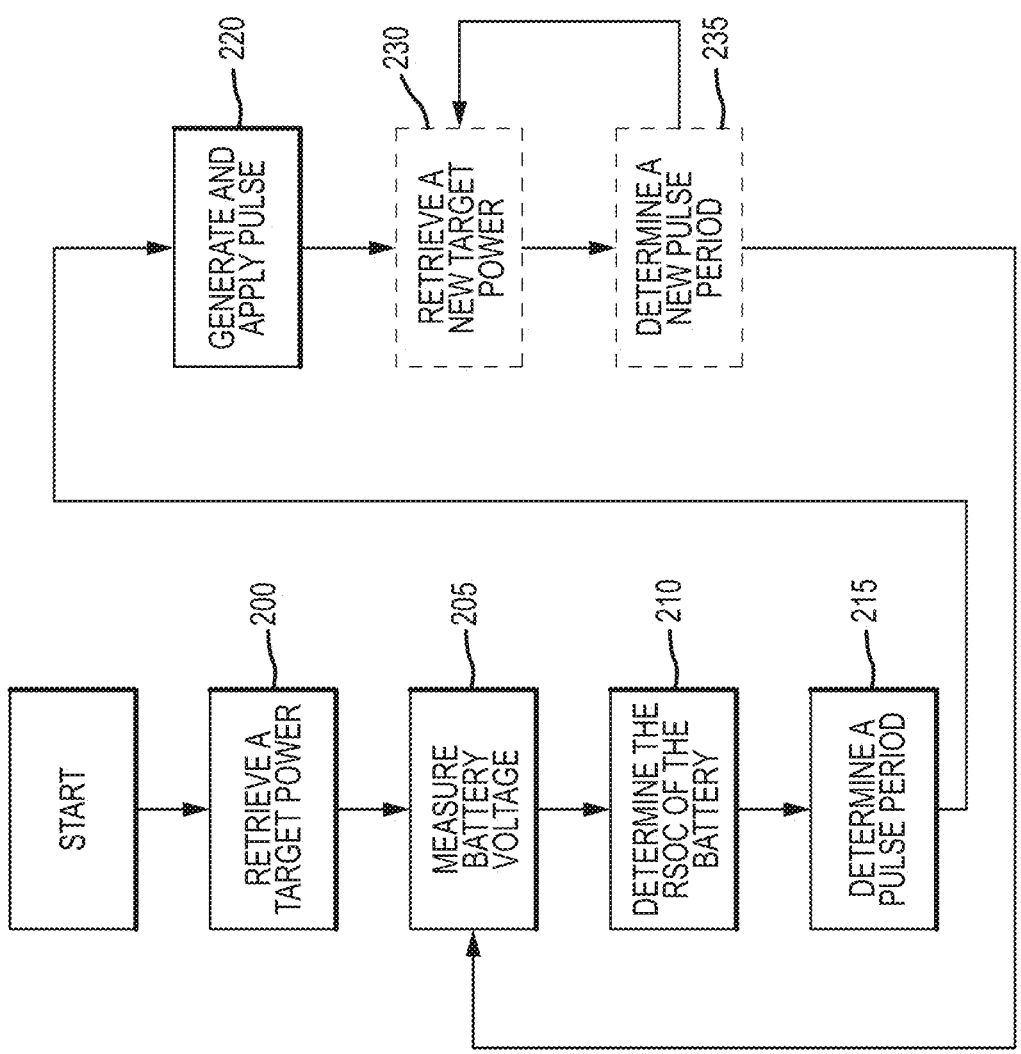
FIG. 2 is a flow chart for operating the system in accordance with an exemplary embodiment of the present technology.
Figure 3:
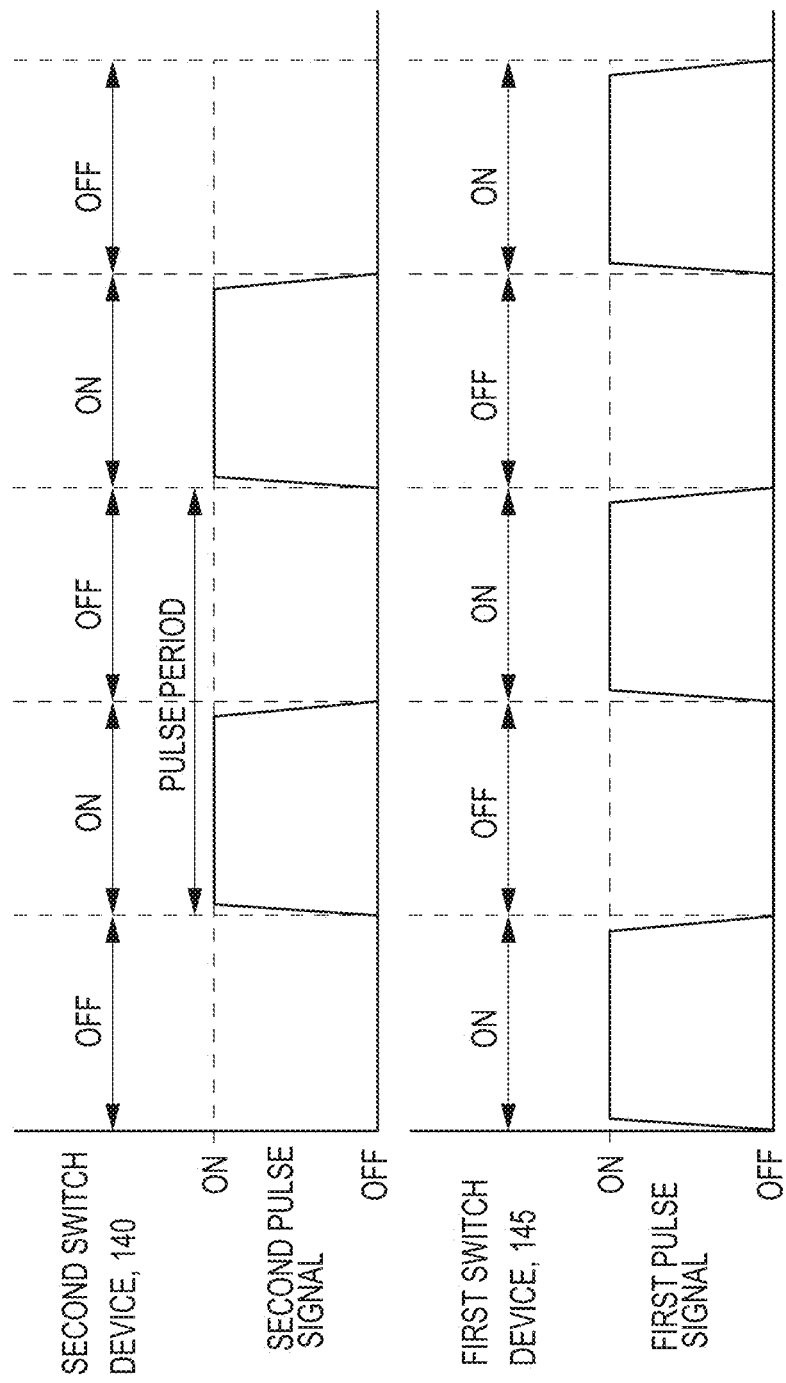
FIG. 3 illustrates the operation states of a first switch and a second switch and corresponding pulse signals in accordance with an exemplary embodiment of the present technology.

Methods and apparatus for induction heating according to various aspects of the present technology may operate in conjunction with any suitable electronic system and/or device, such as consumer electronics, portable devices, battery-powered heating devices, and the like. Referring to FIG. 1, an exemplary system 100 may comprise a heating element 103 powered by a rechargeable battery 115 and a control circuit 105 to control the amount of power supplied to heating element 103. In one application, the system 100 may be integrated into various electronic cigarettes, such as an electronic cigarette used for heating a cartridge containing a liquid (i.e., a vapor cartridge), and a hybrid electronic cigarette used for heating dried tobacco leaves or a conventional cigarette. In various embodiments, the system 100 may further comprise a sensor 192 to detect when a user applies a suction force (i.e., a puff) to the electronic cigarette, which activates the control circuit 105 and/or the heating element 103.

The battery 115 provides power to the heating element 103 and/or other components in the system 100, such as the control circuit 105. The battery 115 may comprise a rechargeable battery, such as a rechargeable lithium ion battery. Alternatively, the battery 115 may comprise a nickel-metal hydride battery, a nickel cadmium battery, or a lithium-based battery, such as a lithium-cobalt, a lithium-iron-phosphate, lithium titanate or a lithium-polymer battery, and the like.

The heating element 103 may be configured as an inductive heater comprising a hollow vessel 120 surrounded by a first induction coil 125 and a second induction coil 130. The vessel 120 may be formed from a magnetic material, for example carbon steel alloy, or any other alloy steel. In an exemplary embodiment, the vessel 120 may be a cylinder shape having a first end 180 and an opposing, second end 185. The vessel 120 may be further adapted to hold or contain a substance, such as dried tobacco, a conventional cigarette, or the vapor cartridge.

The first induction coil 125 may comprise a first end 160 and a second end 165 and the first induction coil 125 may be wrapped around an outside wall of the vessel 120 forming a spiral shape along a length of the vessel 120. Similarly, the second induction coil 130 may comprise a first end 170 and a second end 175 and the second induction coil 130 may be wrapped around the outside wall of the vessel 120 forming a spiral shape along the length of the vessel 120. In various embodiments, each induction coil 125, 130 operate independently from the other.

According to an exemplary embodiment, the first end 160 of the first induction coil 125 may be connected to a positive terminal (+) of the battery 115 and the second end 165 may be selectively connected to a reference voltage, such as a ground potential, via a first switch 145. In addition, the second end 175 of the second induction coil 130 may be connected to the positive terminal (+) of the battery 115 and the first end 170 may be selectively connected to the reference voltage via a second switch 140.

Alternatively, first end 160 of the first induction coil 125 may be connected to a negative terminal (−) of the battery 115 and the second end 165 may be selectively connected to a positive voltage potential via the first switch 145. In addition, the second end 175 of the second induction coil 130 may be connected to the negative terminal (−) of the battery 115 and the first end 170 may be selectively connected to the positive voltage potential via a second switch 140.

In addition, the system 100 may comprise one or more capacitors to provide a stable operation of the heating element 103 and/or stable generation of currents through the first and second induction coils 125, 130. For example, a first capacitor 155 may be connected between the first and second ends 160, 165 of the first induction coil 125. Similarly, a second capacitor 150 may be connected between the first and second ends 170, 175 of the second induction coil 130.

According to an exemplary embodiment, the control circuit 105 selectively operates the heating element 103 by applying a signal (or pulse) to the first and second switches 145, 140. For example, the control circuit 105 may selectively operate the first switch 145 to generate or otherwise control a first current $I_1$ through the first induction coil 125. Similarly, the control circuit 105 may selectively operate the second switch 140 to generate or otherwise control a second current $I_2$ through the second induction coil 130. Each switch 140, 145 may comprise any device responsive to a signal and suitable for providing selective connection between two or more devices and/or to a desired voltage potential.

Each of the first and second switches 145, 140 may comprise a transistor such as a field effect transistor (FET) that uses an electric field to control the electrical behavior of the device. Many different implementations of field effect transistors exist. A field effect transistor may be a desired implementation since it generally displays very high input impedance at low frequencies.

Figure 6:
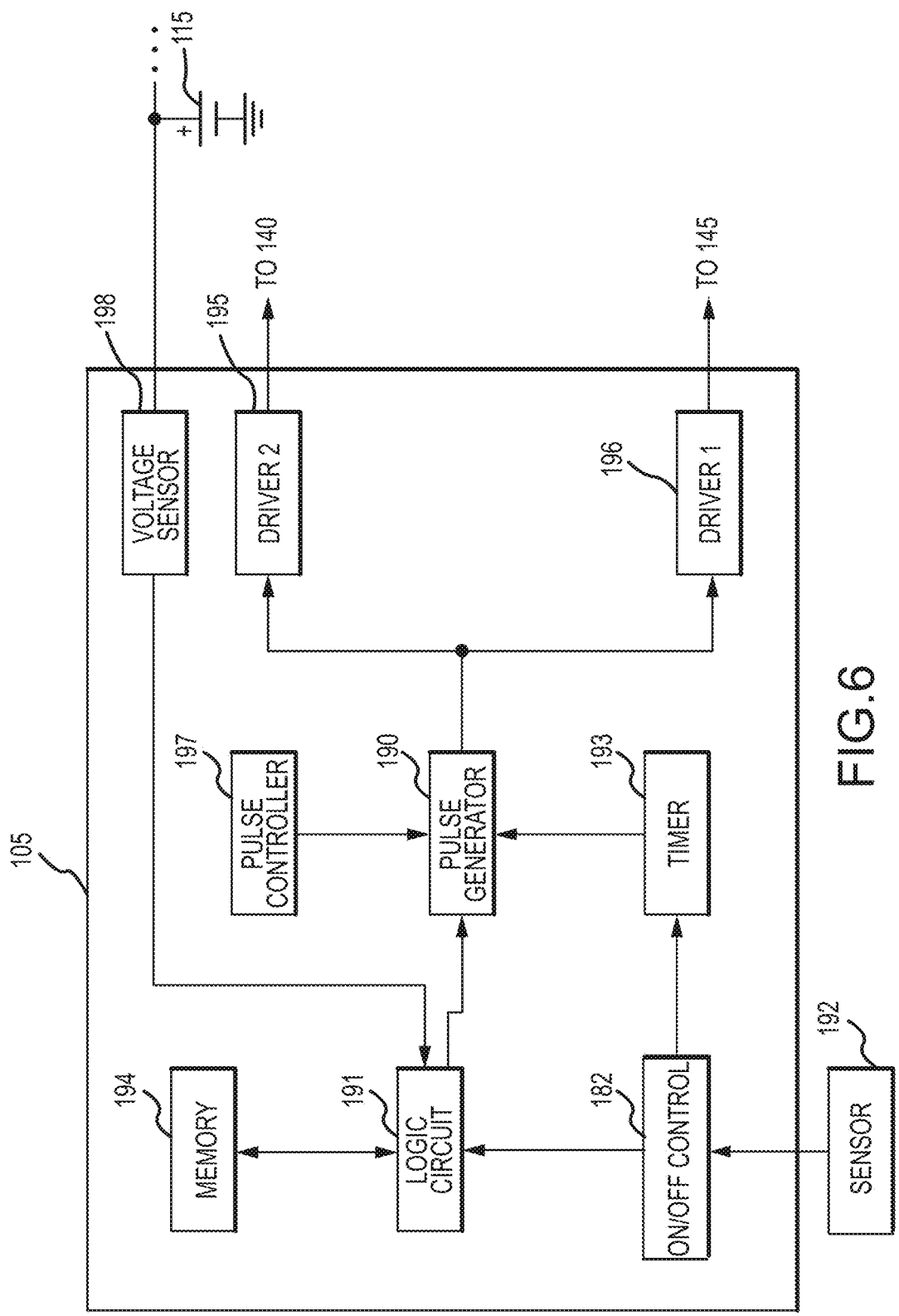
FIG. 6 is a block diagram of a control circuit in accordance with an exemplary embodiment of the present technology.

Referring to FIGS. 1 and 6, the control circuit 105 controls and/or manages the functions of the battery 115, the heating element 120, according to various input signals, such as input signals from the sensor 192. The control circuit 105 may comprise an integrated circuit comprising various circuits and/or systems that operate together to provide the desired outputs and/or control signals. In addition, the control circuit 105 may be connected to the battery 115 and configured to measure various battery characteristics, such as voltage, current, temperature, and the like.

According to an exemplary embodiment, the control circuit 105 may comprise a voltage sensor 198, an ON/OFF control circuit 182, a logic circuit 191, a memory 194, a pulse generator 190, a pulse controller 197, a timer 193, a first driver 196, and a second driver 195 that operate together to control or otherwise manage various functions of the system 100, such as measuring a voltage of the battery 115, computing a relative state of charge of the battery 115, determining a desired pulse period, controlling power to the heating element 103, and the like. The control circuit 105 may be formed as an integrated circuit on a single chip or integrated across multiple chips.

The ON/OFF control circuit 182 may be responsive to a signal from the sensor 192 indicating if the user has taken a "puff" from the electronic cigarette. In such a case, the ON/OFF control circuit 182 may generate one or more activation signals to activate various operations. For example, the ON/OFF control circuit 182 may transmit the activation signal to the logic circuit 191 to activate an operation of the logic circuit 191 and/or the timer 193 to activate an operation of the timer 193. The ON/OFF control circuit 182 may comprise any circuit and/or device suitable for acting as an interface between the sensor 192 and the control circuit 105 and activating other components in the control circuit 105.

The voltage sensor 198 detects and/or measures a voltage of the battery 115. For example, the voltage sensor 198 may be connected to the positive terminal of the battery 115 and may comprise a conventional voltage sensor that measures voltage based on a voltage divider. The voltage sensor 198 may also be connected to the logic circuit 191 and configured to provide a measured voltage of the battery 115 to the logic circuit 191. Alternatively, or addition, the voltage sensor 198 may transmit a measured voltage to the memory 194.

The logic circuit 191 may be configured to perform various calculations and determine a desired timing for operating the heating element 103. For example, the logic circuit 191 may be configured to determine the relative state of charge (RSOC) of the battery 115 and select the pulse period based on the RSOC.

According to an exemplary embodiment, the logic circuit 191 may be connected to the ON/OFF control circuit 182 and responsive to the activation signal. For example, the logic circuit 191 may be configured to perform a sequence of steps when the logic circuit 191 receives the activation signal.

In addition, the logic circuit 191 may be in communication with the memory 194. For example, the logic circuit 191 may deliver data to the memory 194 and/or retrieve data from the memory 194. In an exemplary embodiment, the logic circuit 191 may utilize data stored in memory 194 to perform calculations and/or make decisions regarding operation of the heating element 103.

Figure 4:
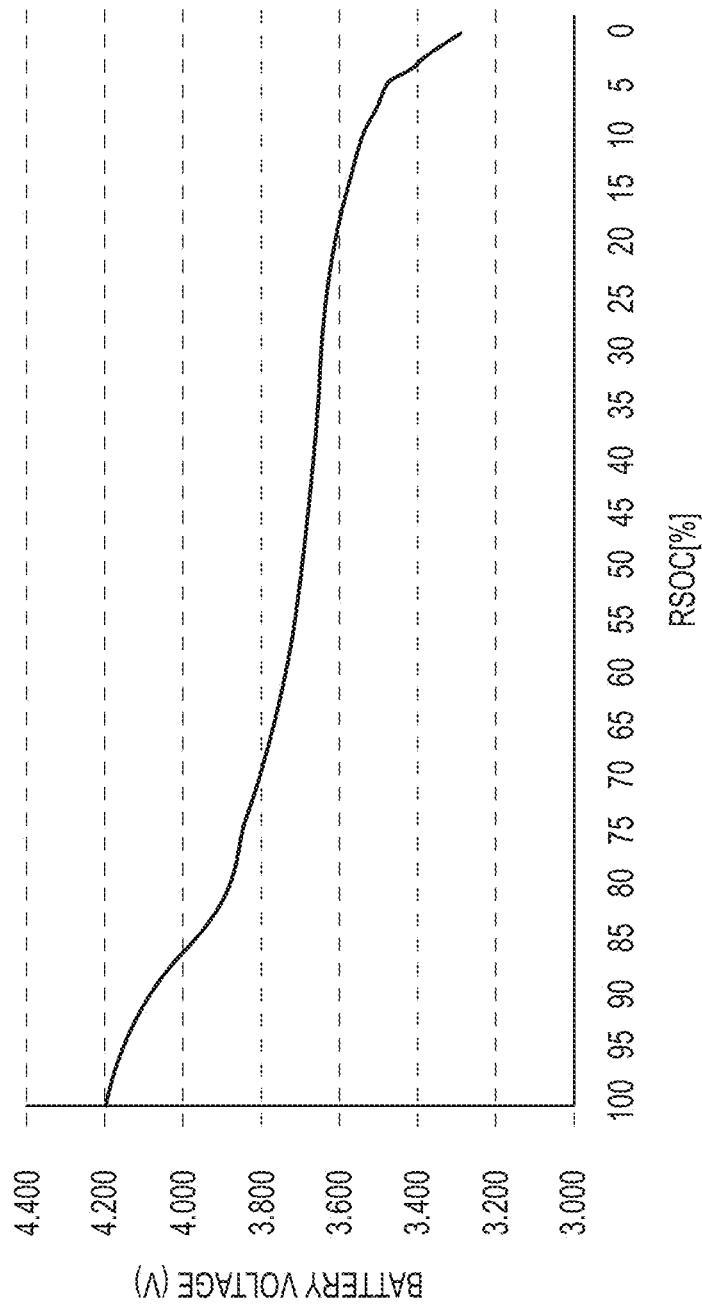
FIG. 4 is a graph illustrating a relationship between a voltage of a battery and a relative state of charge of the battery in accordance with an exemplary embodiment of the present technology.
Figure 5:
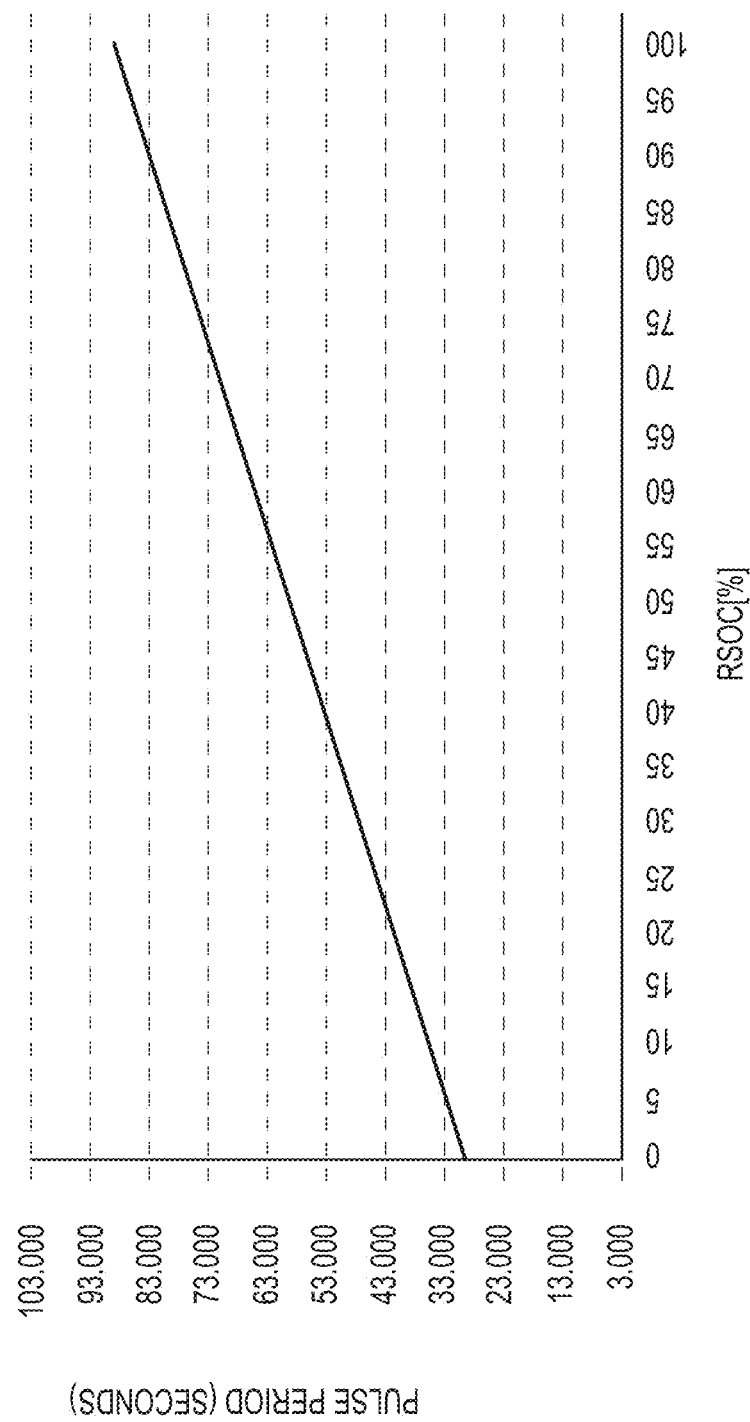
FIG. 5 is a graph illustrating a relationship between a pulse period for the operation states and the relative state of charge of the battery in accordance with an exemplary embodiment of the present technology.

The memory 194 may be accessible to the logic circuit 191 and be configured to store various data points and/or data sets. In an exemplary embodiment, the memory 194 may store battery voltage values and a corresponding RSOC value for each voltage value, such as the data illustrated in FIG. 4. For example, the memory 194 may store the battery voltage values and RSOC values in a look-up table or any other storage solution suitable for storing relational data. In addition, the memory 194 may store RSOC values and a corresponding pulse period for each RSOC value, such as the data illustrated in FIG. 5. For example, the memory 194 may store the RSOC values and pulse periods in a look-up table or other storage solution suitable for storing relational data.

In an exemplary embodiment, the memory 194 may store multiple data sets indicating the relationships between RSOC values and pulse periods, wherein each data set is specific to a particular temperature of the heating element 103 (and corresponding target power). For example, a first set of data may be used when the heating element 103 is at an initial state and the temperature and/or power is at an initial value. A second set of data may be used after the heating element 103 has been in operation and the temperature of the heating element 103 is higher than during the initial state.

The pulse generator 190 may be responsive to the logic circuit 191 and configured to generate an output that may be represented as a first pulse signal and a second pulse signal, wherein the first and the second pulse signals are non-overlapping pulses. For example, the pulse generator 190 may generate an alternating pulse waveform that may be split into the first pulse signal and the second pulse signal. Alternatively, the pulse generator 190 may generate two separate pulse signals. The pulse generator 190 may comprise any circuit and/or system suitable for generating alternating pulse signals, wherein the pulse period and/or the duty cycle of the pulse signal are controllable.

In one embodiment, the pulse generator 190 may comprise an H-bridge circuit comprising a set of transistors that are capable of being turned "ON" and "OFF" in an alternating sequence according to a signal (voltage) from the logic circuit 191. The alternating operation sequence results in reversed states at a first output terminal and a second output terminal of the pulse generator 190. For example, the polarities at the outputs terminals are reversed and may switch from positive to negative in sequence. Accordingly, when one terminal is positive, the remaining terminal is negative. In the present case, the first output terminal may generate the first pulse signal and the second output terminal may generate the second pulse signal.

In various embodiments, the pulse generator 190 may also be responsive to the timer 193. The timer 193 may be configured to generate a count value and may be activated by the ON/OFF control circuit 182. The timer 193 may transmit the count value to the pulse generator 190, wherein the pulse generator 190 generates the output waveform (and first and second pulse signals) according to the signal from the logic circuit 191 and the count value.

The first driver 196 may be connected to the first output terminal of the pulse generator 190 and configured to apply the first pulse signal to the first switch 145. Similarly the second driver 195 may be connected to the pulse generator 190 and configured to apply the second pulse signal to the second switch 140. Accordingly, the drivers 195, 196 operate the switches in turn (one after the other). In other words, when one switch is ON the remaining switch is OFF. The drivers 195, 195 may comprise any circuit and/or device suitable for relaying and/or driving a signal to a load, such as the switches 140, 145.

The pulse controller 197 may be connected to the pulse generator 190 and may be configured to prevent overlapping of the first and second pulse signals. The pulse controller 197 may comprise any circuit and/or device suitable for providing a delay.

In operation, and referring to FIGS. 1-6, the control circuit 105 may operate the first and second switches 145, 140 in an alternating manner, thereby generating alternating and opposing currents through the first and second induction coils 125, 130. In addition, the control circuit 105 may operate the first and second switches 145, 140 according a pulse period that is based on the battery voltage and RSOC.

In an exemplary operation, the ON/OFF control circuit 182 may activate a start condition based on information from the sensor 192. For example, the ON/OFF control circuit 182 may activate operation of the logic circuit 191. The logic circuit 191, once activated, may retrieve a target power from the memory 194 (200). The target power may be a pre-set value based on the desired operating specifications and/or a measured temperature of the system 100 and/or the operating specifications of a device that incorporates the system 100. The logic circuit 191 may then measure the voltage of the battery 115 (205). For example, the logic circuit 191 may utilize the voltage sensor 198 to measure the voltage. The logic circuit 191 may then determine the RSOC of the battery 115 (210). For example, the logic circuit 191 may retrieve the RSOC value that corresponds to the measured voltage (from step 205) from the memory 194. For example, referring to FIG. 4, if the measured voltage is 3.8 V, then the corresponding RSOC is 70%.

The logic circuit 191 may then determine a pulse period based on the RSOC value (as determined from step 210) (215). For example, referring to FIG. 5, if the RSOC from the previous step is 70%, then the corresponding pulse period is, for example approximately 73 seconds, with a 50% duty cycle. The RSOC and the pulse period are directly proportional, as such, as the RSOC increases the pulse period also increases and vice versa.

The logic circuit 191 may then generate a corresponding signal (e.g., voltage or current) and transmit the signal to the pulse generator 190. The pulse generator 190 may then generate an output waveform comprising the first and second pulse signals, wherein the first and second pulse signals are non-overlapping and each have the desired pulse period (as determined from step 215), and apply the first and second pulse signals to the first and second switches 145, 140, respectively (220). A longer pulse period results in a lower frequency signal, while a shorter pulse period results in a higher frequency signal. In an exemplary application, the higher frequency results in a higher temperature on the vessel 120 where the cigarette or dried tobacco is inserted, and the lower frequency results in a lower temperature.

As each switch 140, 145 is switched ON and OFF, each switch connects the respective induction coil to the ground potential and generates current flow through the respective induction coil. Since the switches 140, 145 are operated in turn, the current flow is also generated in turn. In addition, since the induction coils 125, 130 are arranged in a reverse manner, the first current $I_1$ flows in a first direction and the second current $I_2$ flows in an opposite, second direction. Furthermore, the opposing currents in the induction coils generate opposing magnetic flux. The alternating operation of the induction coils 125, 130 may provide stable flux, efficient energy use, and rapid heating of the vessel 120.

In various embodiments, the logic circuit 191 may retrieve a new target power (230) as the temperature of the heating element 103 changes during operation. The logic circuit 191 may then determine a new pulse period based on the new target power and/or change in temperature. For example, the logic circuit 191 may retrieve the new pulse period from the memory 194.

Periodically, while the system 100 is in operation, the control circuit 105 may periodically measure a new battery voltage (205), determine a new RSOC (210), determine a new pulse period (215), and generate and apply the pulse signals to the switches 140, 145 (220) as described above, to maintain a stable temperature of the heating element 103. For example, a battery with a higher voltage provides higher a higher temperature on the vessel 120 where the cigarette or tobacco is inserted, and a battery with a lower voltage provides a lower temperature. So, to keep the temperature of the heating element 103 stable, the system 100 manages the frequency of the pulse signals in accordance with the battery voltage (which has an inverse relationship with the RSOC).

For example, if the battery voltage is high, then the system 100 may generate the pulse signals to have a lower frequency, and if the battery voltage is low, then the system 100 may generate the pulse signals to have a higher frequency.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An electric cigarette with induction heating powered by a battery as a direct current (DC) power supply, the electric cigarette comprising:
    a first induction coil comprising a first end connected to a positive terminal of the battery at a node;
    a second induction coil comprising a second end connected to the positive terminal of the battery via the node;
    a first switch configured to selectively connect a second end of the first induction coil to a ground potential;
    a second switch configured to selectively connect a first end of the second induction coil to the ground potential,
    a pulse generator configured to generate a first pulse signal and a second pulse signal;
    a first driver configured to connect to the pulse generator and relay the first pulse signal to the first switch; and
    a second driver configured to connect to the pulse generator and relay the second pulse signal to the second switch,
    wherein the pulse generator generates the first and second pulse signals to respectively operate the first and second switches in turn.

2. The electric cigarette of claim 1, wherein the pulse generator is further configured to prevent overlapping of the first and second pulse signals.

3. The electric cigarette of claim 1,
    wherein the first induction coil and the second induction coil are wrapped around a hollow vessel, and
    wherein the hollow vessel comprises a first end and a second end.

4. The electric cigarette of claim 1, further comprising:
    a first capacitor connected to the first induction coil; and
    a second capacitor connected to the second induction coil.

5. The electric cigarette of claim 1, wherein a number of turns of the first induction coil is greater than a number of turns of the second induction coil.

6. The electric cigarette of claim 5, wherein the number of turns of the first induction coil is greater than the number of turns of the second induction coil by 1.

7. The electric cigarette of claim 3, wherein the hollow vessel is a single, magnetic cylinder.

8. The electric cigarette of claim 3, wherein the hollow vessel is configured to hold or contain a substance.

9. The electric cigarette of claim 8, wherein the first induction coil and the second induction coil heat the substance.

10. The electric cigarette of claim 8, wherein the substance includes dried tobacco.

11. The electric cigarette of claim 10, wherein the first induction coil and the second induction coil heat the dried tobacco.

12. The electric cigarette of claim 3, wherein the first induction coil and the second induction coil are wrapped around the hollow vessel in a spiral shape.

13. The electric cigarette of claim 1, wherein each of the first and second switches is a transistor.

14. The electric cigarette of claim 13, wherein each of the first and second switches is field effect transistor.

15. The electric cigarette of claim 1, further comprising a control circuit,
    wherein the control circuit includes the pulse generator, and
    wherein the control circuit is configured to control at least one of a pulse period or a pulse width of the first and second pulse signals.

16. The electric cigarette of claim 1, further comprising a control circuit,
  wherein the control circuit includes the pulse generator, and
  wherein the control circuit is configured to measure characteristics of the battery.

17. The electric cigarette of claim 16, wherein the characteristics of the battery include at least one of voltage or current.

18. The electric cigarette of claim 1, further comprising:
  a control circuit; and
  a sensor,
  wherein the control circuit includes the pulse generator and an ON/OFF control circuit, and
  wherein the ON/OFF control circuit is configured to activate components of the control circuit based upon an output of the sensor.

19. The electric cigarette of claim 1, further comprising a control circuit,
  wherein the control circuit includes the pulse generator, a logic circuit, and an ON/OFF control circuit, and
  wherein the ON/OFF control circuit is configured to activate the logic circuit.

* * * * *